United States Patent
Eiselt et al.

(10) Patent No.: US 8,284,391 B2
(45) Date of Patent: Oct. 9, 2012

(54) METHOD AND ARRANGEMENT FOR MEASURING A SIGNAL POWER

(75) Inventors: Michael Eiselt, Kirchheim (DE); Toni Wald, Kaltennordheim (DE)

(73) Assignee: ADVA AG Optical Networking, Martinsried/Munich (DE)

( * ) Notice: Subject to any disclaimer, the term of this patent is extended or adjusted under 35 U.S.C. 154(b) by 293 days.

(21) Appl. No.: 12/649,983

(22) Filed: Dec. 30, 2009

(65) Prior Publication Data
US 2010/0208246 A1    Aug. 19, 2010

(30) Foreign Application Priority Data
Feb. 18, 2009    (DE) .......................... 10 2009 000 988

(51) Int. Cl.
*G01J 1/02* (2006.01)
(52) U.S. Cl. ....................................................... 356/213
(58) Field of Classification Search .................. None
See application file for complete search history.

(56) References Cited

U.S. PATENT DOCUMENTS

| 4,947,033 | A | 8/1990 | Kordts et al. | |
| 5,825,516 | A | 10/1998 | Walsh | |
| 6,864,968 | B2 * | 3/2005 | Mori et al. | 356/73.1 |
| 6,876,790 | B2 * | 4/2005 | Lee | 385/33 |
| 7,813,646 | B2 * | 10/2010 | Furey | 398/140 |

FOREIGN PATENT DOCUMENTS

| DE | 3800265 A1 | 7/1989 |
| DE | 69721405 T2 | 1/2004 |

OTHER PUBLICATIONS

German Office Action from DE 10 2009 000 988.4 dated Nov. 13, 2009.

* cited by examiner

*Primary Examiner* — Tu Nguyen
(74) *Attorney, Agent, or Firm* — Jenkins, Wilson, Taylor & Hunt, P.A.

(57) ABSTRACT

The invention relates to a method and an arrangement for measuring power for an optical user signal transmitted via an optical fiber by converting the transmitted optical user signal into a pulsed optical measurement signal, the pulse repetition rate of which is dependent on the power of the transmitted optical user signal, and evaluating the pulse repetition rate of the converted optical measurement signal in order to ascertain the power of the optical user signal transmitted via the optical fiber.

11 Claims, 3 Drawing Sheets

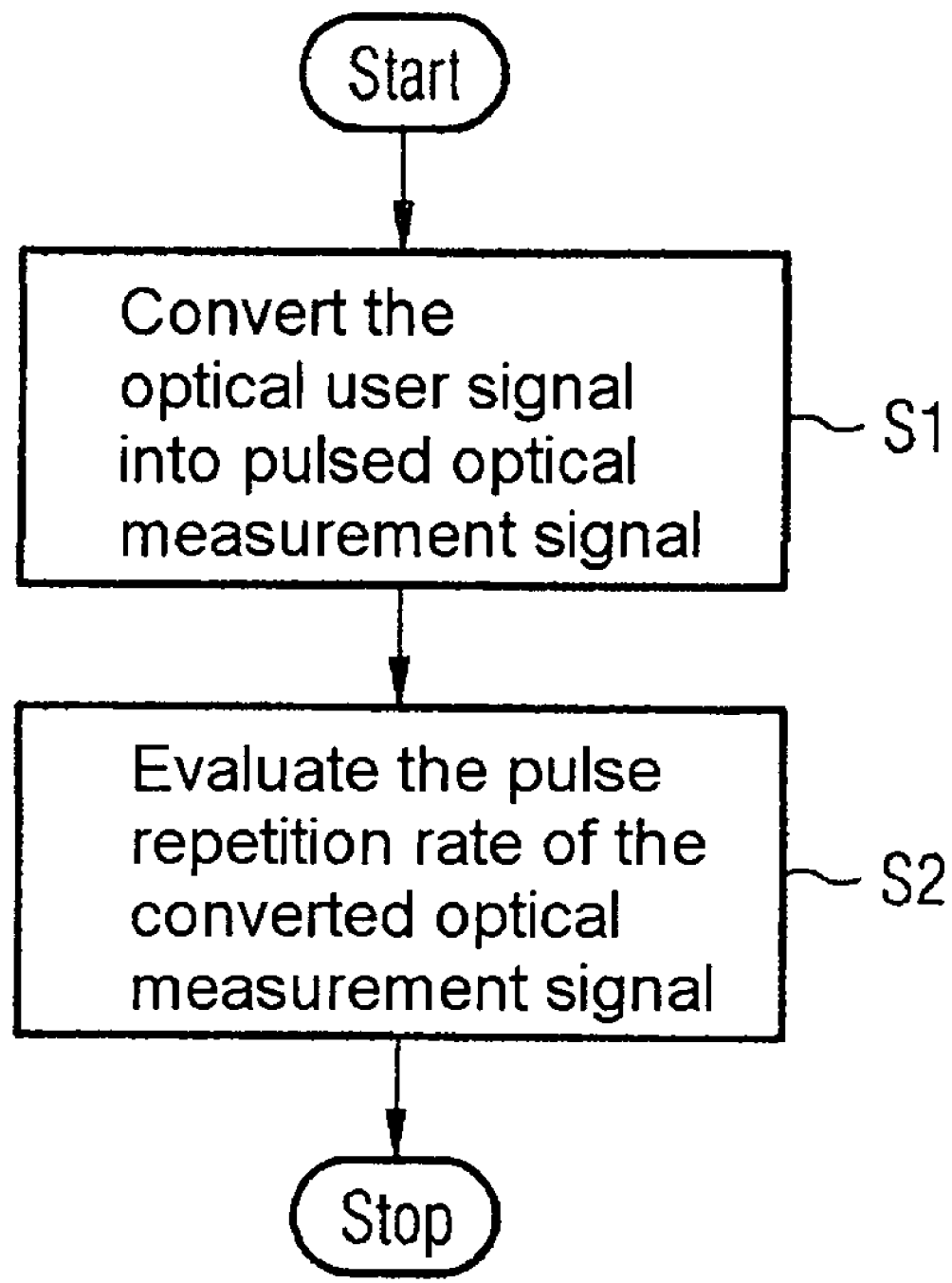

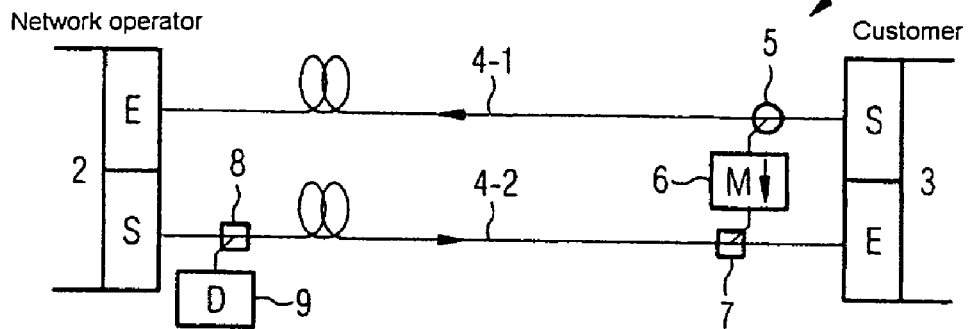
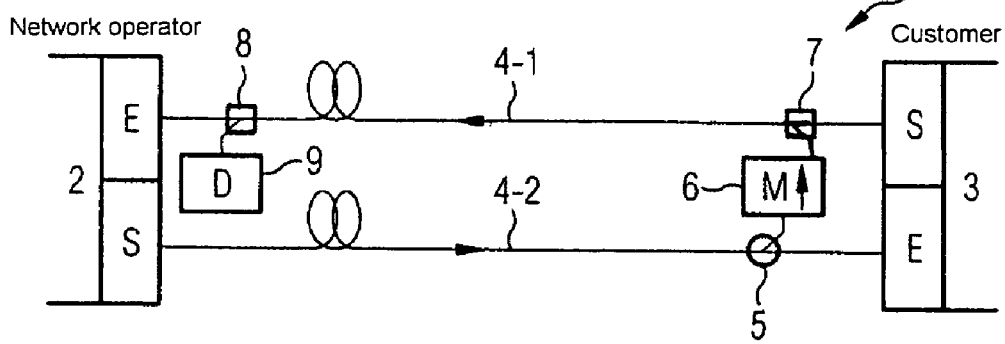
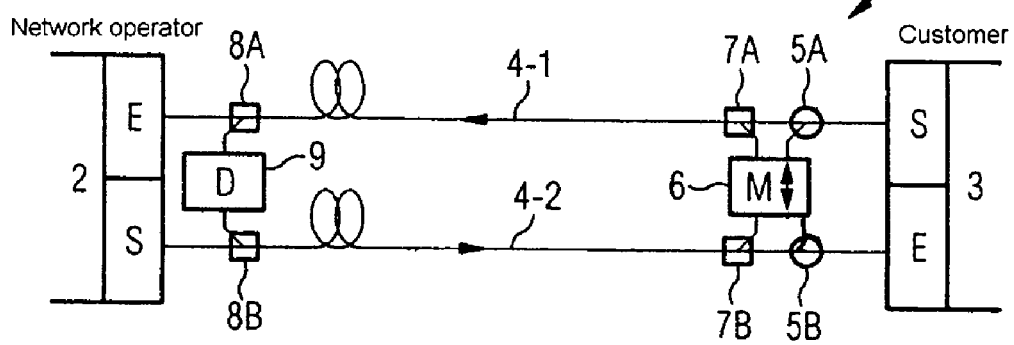
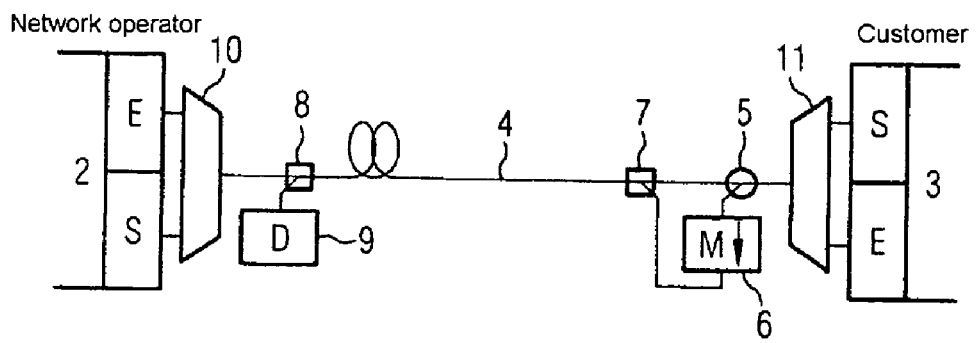

METHOD AND ARRANGEMENT FOR MEASURING A SIGNAL POWER

CROSS-REFERENCE TO RELATED APPLICATION

This application claims the priority of German patent application No 10 2009 000 988.4, filed on Feb. 18, 2009, the full disclosure of which is intended to be included here by reference thereto.

FIELD OF THE INVENTION

The invention relates to a method and an arrangement for measuring a power for an optical user signal transmitted via an optical fiber.

BACKGROUND OF THE INVENTION

In an optical access network, the optical fiber link between a peripheral communication appliance of a network operator and an interface appliance of a user is typically the property of the network operator and is operated thereby.

The network operator guarantees its customers or the user a particular signal quality or transmission quality up to the user's interface.

In conventional systems, an additional interface appliance is therefore usually provided by the network operator at the location of the respective user, said additional interface appliance measuring the quality of the signal which is delivered to the user and which is adopted by the user. This additional interface appliance for ascertaining the signal quality for the user represents an additional outlay for the network operator, however. Furthermore, this interface terminal takes up additional space at the location of the user or customer. A further drawback is that the additional interface appliance consumes power for the signal quality measurement itself and hence the power consumption increases. In addition, the interface appliance provided for signal quality measurement requires separate maintenance.

It is therefore an object of the present invention to provide a method and an arrangement for measuring a power for an optical user signal transmitted via an optical fiber which have minimal power consumption.

The invention provides a method for measuring a power for an optical user signal transmitted via an optical fiber.

The invention provides a method for measuring a power for an optical user signal transmitted via an optical fiber, having the following steps:
(a) the transmitted optical user signal is converted (S1) into a pulsed optical measurement signal, the pulse repetition rate of which is dependent on the power of the transmitted optical user signal;
(b) the pulse repetition rate of the converted optical measurement signal is evaluated (S2) in order to ascertain the power of the optical user signal transmitted via the optical fiber.

In one embodiment of the method according to the invention, the optical user signal is transmitted via the optical fiber between a network operator transceiver of a network operator and a user transceiver of a user.

In one embodiment of the method according to the invention, the transmitted optical user signal is at least partially decoupled from the optical fiber at the user transceiver end by means of a power splitter for the purpose of measuring power.

In one embodiment of the method according to the invention, the converted, pulsed, optical measurement signal is launched into the optical fiber of the optical user signal to be transmitted or into a different optical fiber by means of a multiplexer and is supplied to a detection device situated at the network operator transceiver end for the purpose of evaluating the pulse repetition rate of the pulsed, optical measurement signal.

In one embodiment of the method according to the invention, the optical measurement signal has a different wavelength than the optical user signal.

In one embodiment of the method according to the invention, the pulse repetition rate of the pulsed, optical measurement signal is proportional to the power of the transmitted optical measurement signal.

The invention also provides a measurement arrangement for measuring a power for an optical user signal transmitted via an optical fiber.

The invention provides a measurement arrangement for measuring power for an optical user signal transmitted via an optical fiber, having:
(a) a signal conversion device for converting the optical user signal into a pulsed optical measurement signal, the pulse repetition rate of which is dependent on the power of the optical user signal; and having
(b) a detection device which evaluates the pulse repetition rate of the converted pulsed optical measurement signal in order to ascertain the power of the optical user signal transmitted via the optical fiber.

In one embodiment of the measurement arrangement according to the invention, a power splitter is provided which at least partially decouples the optical user signal transmitted on the optical fiber.

In one embodiment of the measurement arrangement according to the invention, a multiplexer is provided which loops back the optical measurement signal into the optical fiber of the optical user signal or launches it into a different optical fiber.

In one embodiment of the measurement arrangement according to the invention, the signal conversion device has:
  a photodiode which converts the decoupled optical user signal into an electrical charging current,
  a capacitor which is charged by the charging current until a threshold value voltage is reached, and
  a nonlinear electronic circuit which connects the charged capacitor to a laser diode when the threshold value voltage is reached, said capacitor being discharged via the laser diode, which emits optical light pulses.

In one embodiment of the measurement arrangement according to the invention, the signal conversion device and the detection device are provided at opposite ends of the optical fiber provided for the transmission of the optical user signal.

The invention also provides an optical fiber for transmitting an optical user signal.

The invention provides an optical fiber for transmitting an optical user signal, wherein at least one of the two ends of the optical fiber is provided with a signal conversion device which converts the optical user signal into a pulsed, optical measurement signal, the pulse repetition rate of which is dependent on the power of the transmitted optical user signal.

In one embodiment of the optical fiber according to the invention, the other end of the optical fiber is provided with a detection device which evaluates the pulse repetition rate of the converted, pulsed, optical measurement signal in order to ascertain the power of the optical user signal transmitted via the optical fiber.

In one embodiment of the optical fiber according to the invention, the optical fiber has a power splitter which at least partially decouples the optical user signal transmitted on the optical fiber to the signal conversion device.

In one embodiment of the optical fiber according to the invention, the optical fiber has a multiplexer which loops back the optical measurement signal into the optical fiber of the optical user signal or launches it into a different optical fiber.

BRIEF DESCRIPTION OF THE DRAWINGS

Embodiments of the method according to the invention and of the arrangement according to the invention for measuring a power for an optical user signal transmitted via an optical fiber are described below with reference to the appended figures, in which:

FIG. 1: shows a simple flowchart for a possible embodiment of the method according to the invention for measuring a power for an optical user signal transmitted via an optical fiber;

FIGS. 2A-2D: show exemplary embodiments of a measurement arrangement according to the invention for measuring a power for an optical user signal transmitted via an optical fiber;

DETAILED DESCRIPTION OF THE DRAWINGS

Figure 3:
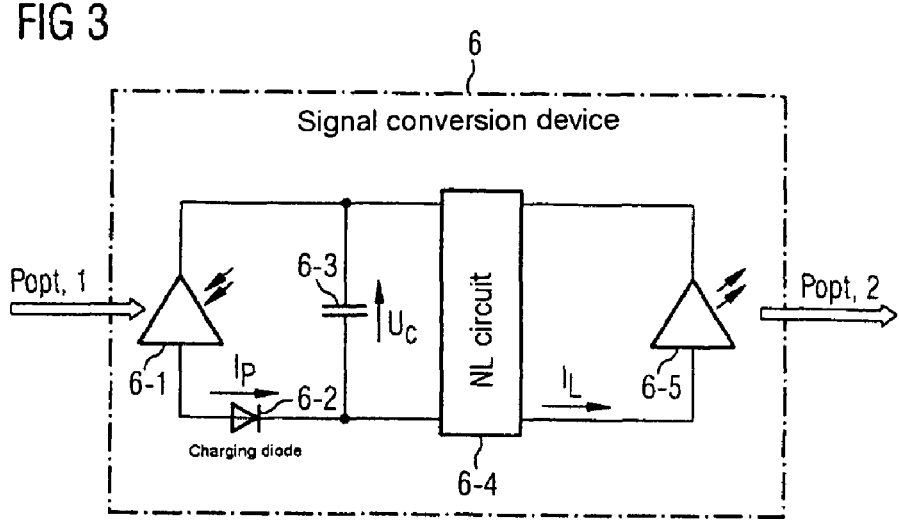
FIG. 3: shows an exemplary embodiment of a signal conversion device used in the measurement arrangement according to the invention.

As can be seen from FIG. 1, the method according to the invention for measuring a power for an optical user signal transmitted via an optical fiber involves the measurement process being performed in two steps.

In a first step S1, the optical user signal transmitted via the optical fiber is converted into a pulsed, optical measurement signal, the pulse repetition rate of which is dependent on the power of the transmitted optical user signal. In one possible embodiment, the pulse repetition rate of the pulsed, optical measurement signal is in this case proportional to the power of the transmitted optical measurement signal.

In a further step S2, the pulse repetition rate of the converted optical measurement signal is evaluated in order to ascertain the power of the optical user signal transmitted via the optical fiber.

FIGS. 2A, 2B, 2C and 2D show various exemplary embodiments of a measurement arrangement 1 according to the invention for measuring a power P for an optical user signal transmitted via an optical fiber.

The optical user signal is transmitted via at least one optical fiber between a transceiver 2 of a network operator and a transceiver 3 of a user or a customer. Both transceivers 2, 3 respectively have a transmitter S and a receiver E.

In the exemplary embodiment shown in FIG. 2A, there is a connection, comprising two optical fibers 4-1 and 4-2, between the transceiver 2 of the network operator and the transceiver 3 of the user. Both optical fibers 4-1, 4-2 can be used to transmit an optical user signal between the transceiver 2 of the network operator and the transceiver 3 of the user. As shown in FIG. 2A, the transmitted optical user signal is at least partially decoupled from the optical fiber 4-1 at the user transceiver end 3 by means of a power splitter 5 for the purpose of measuring power. In the exemplary embodiment shown in FIG. 2A, the decoupled signal is supplied to a signal conversion device 6 which converts the decoupled optical user signal into a pulsed optical measurement signal, the pulse repetition rate of which is dependent on the power P of the optical user signal. In the measurement arrangement 1 shown in FIG. 2A, there is also a multiplexer 7 provided which launches the pulsed optical measurement signal generated by the signal conversion device 6 into the other optical fiber 4-2. In one possible embodiment, the optical measurement signal has a different wavelength than the optical user signal. In the exemplary embodiment shown in FIG. 2A, the converted pulsed optical measurement signal is decoupled via the optical fiber 4-2 to a demultiplexer 8 which supplies the optical measurement signal to a detection device 9 situated at the network operator transceiver end 2. The detection device 9 evaluates the pulse repetition rate of the decoupled pulsed optical measurement signal in order to ascertain the power P of the original optical user signal transmitted via the optical fiber 4-1.

In the embodiment shown in FIG. 2A, the measured power P is the signal power of the optical user signal which is emitted by the transceiver 3 of the user and which is decoupled from the optical fiber 4-1 by the power splitter 5.

In the exemplary embodiment shown in FIG. 2B, the power P measured by the detection device 9 is the signal power of the signal emitted by the transceiver 2 of the network operator via the optical fiber 4-2. The signal conversion device 6 receives from the power splitter 5 the optical user signal arriving at the user end and converts it into a pulsed optical measurement signal, the pulse repetition rate of which corresponds to the power P of the optical user signal. Using the multiplexer 7, the generated optical measurement signal is launched into a different optical fiber 4-1 and transmitted back to the network operator. A demultiplexer 8 is then used to decouple the optical measurement signal to a detection device 9.

In the exemplary embodiment shown in FIG. 2C, two measured values or measurement signals are transmitted from the signal conversion device 6 to the detection device 9.

A power splitter 5A decouples the optical user signal on the optical fiber 4-1 to the signal conversion device 6, which generates a first pulsed optical measurement signal, the pulse repetition rate of which corresponds to the power of the decoupled optical user signal, wherein the optical measurement signal is launched into the second optical fiber 4-2 by means of a multiplexer 7B, and the launched user signal is decoupled at the network operator end by a demultiplexer 8B to the detection device 9 in order to evaluate it.

In addition, the signal conversion device 6 receives from the power splitter 5B the optical user signal transmitted on the optical fiber 4-2 and converts it likewise into a pulsed optical measurement signal, the pulse repetition rate of which corresponds to the power of said decoupled optical user signal. The second pulsed optical measurement signal formed, the pulse repetition rate of which is directly proportional to the power of the optical signal, for example, is launched into the optical fiber 4-1 by means of a multiplexer 7A and is decoupled at the other end by means of the demultiplexer 8A for the detection device 9.

In the exemplary embodiments illustrated in FIGS. 2A, 2B and 2C, bidirectional optical data transmission takes place between the transceiver 2 of the network operator and the transceiver 3 of the user on two separate optical fibers 4-1, 4-2.

In the embodiment shown in FIG. 2D, the signal transmission from and to the user is effected via a single optical fiber 4 at different wavelengths $\lambda$. The transceiver end 2 of the network operator is provided with an optical multiplexer/demultiplexer 10, and the transceiver end 3 of the user is provided with an optical multiplexer/demultiplexer 11.

In the exemplary embodiment shown in FIG. 2D, the first optical user signal, emitted by the transmitter S of the transceiver 3 of the user at a wavelength λ1, is partially decoupled by the power splitter 5 to the signal conversion device 6, where it is converted into a pulsed optical measurement signal, the pulse repetition rate of which is dependent on the power P1 of the transmitted first optical user signal at the decoupling point, i.e. the location of the power splitter. This optical measurement signal is launched into the optical fiber 4 by means of the multiplexer 7 and is decoupled to the detection device 9 by the demultiplexer 8. As in the embodiment shown in FIG. 2D, the detection device 9 evaluates the optical measurement signal. The optical pulsed measurement signal has a pulse repetition rate which is proportional to the power P1 of the first optical user signal, which is emitted by the transmitter S of the transceiver 3 of the user.

The knowledge of the transmission and reception powers at the network operator end of the transmission link can be used to determine the comparison with the received measured value for the attenuation loss from a respective optical fiber 4 in the exemplary embodiments shown in FIGS. 2A and 2B. In the embodiment shown in FIG. 2C, the attenuation loss from both optical fibers 4-1, 4-2 can be ascertained. In addition, in the exemplary embodiment in FIG. 2D, the attenuation loss on account of the optical fiber 4 can be ascertained.

In one possible embodiment, the measured value is also transmitted optically at a particular transmission power, and the attenuation loss from both optical fibers 4-1, 4-2 can also be determined for the embodiments shown in FIGS. 2A and 2B. The loss from the second optical fiber 4-2, which is used to transmit the optical measurement signal, is in this case determined from the received measured value transmission power and the transmitted measured value transmission power.

The attenuation losses from the transmission link which are ascertained in this manner form a measure of the quality of the signal transmission for the network operator.

In one possible embodiment, the signal power of the optical user signal can be used directly as a measure of the transmission quality for the customer or user in comparison with specification values.

The coupling ratio of the power splitter 5 used is preferably designed such that the loss from the transmission link is increased only insignificantly, but sufficient signal power for safe determination of the power level is supplied to the signal conversion device 6. In one possible embodiment, the power splitter 5 may have a power splitter ratio of between 90:10 and 99:1.

In one preferred embodiment, the wavelength $\lambda_M$ of the measurement signal is chosen such that it does not match the wavelength of the optical user signal $\lambda_N$. By way of example, if the optical user signal has a wavelength $\lambda_N$ in a wavelength range from 1510 nm to 1620 nm, a wavelength $\lambda_M$ in a different wavelength range, for example in a wavelength range from 1280 nm to 1320 nm, is used for the optical measurement signal, for example.

FIG. 3 shows a block diagram of a possible embodiment of a signal conversion device 6 in the measurement arrangement 1 according to the invention. In the exemplary embodiment shown in FIG. 3, the signal conversion device 6 has at least one photodiode 6-1 which converts the optical user signal decoupled from the power splitter 5 into an electrical charging current. The light signal arriving in the photodiode 6-1 releases electrons which result in a flow of current. A charging diode 6-2 is used to charge a capacitor 6-3 with a charging current until a threshold value voltage is reached. When a threshold value voltage $U_{th}$ has been reached, the voltage $U_c$ across the capacitor 6-3 results in a nonlinear electronic circuit 6-4 connecting the charged capacitor 6-3 to a laser diode 6-5, so that the capacitor 6-3 is discharged via the laser diode 6-5, which emits a respective optical light pulse at the same time. Whereas the power and duration of the emitted optical pulses are determined by the circuit parameters of the electronic circuit used, the pulse repetition rate of the signal pulses from the laser diode 6-5 is a linear function of the charging current for the capacitor 6-3, and hence proportional to the optical power which is incident upon the photodiode 6-1.

Figure 4:
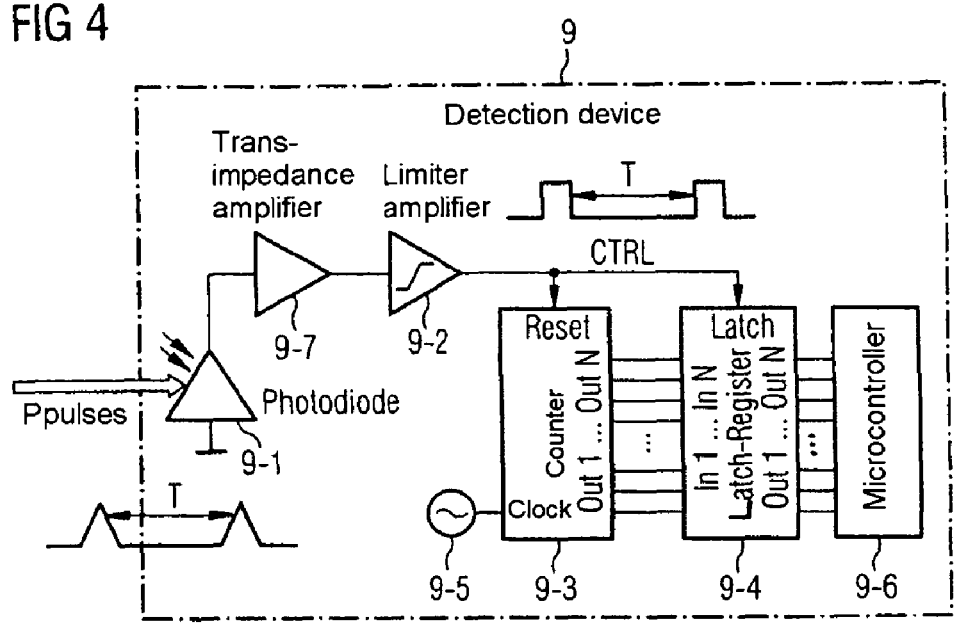
FIG. 4: shows an exemplary embodiment of a detection device used in the measurement arrangement according to the invention.

FIG. 4 shows a block diagram of an exemplary embodiment of the detection device 9, as may be used in the measurement arrangement 1 according to the invention. The detection device 9 evaluates a pulse repetition rate for the received pulsed optical measurement signal. The evaluation of the pulse repetition rate is used for ascertaining the power of the optical user signal originally transmitted via the optical fiber 4.

The measurement signal decoupled from the demultiplexer is supplied to a photodiode 9-1 of the detection device 9, which detects the optical pulse train. The detected signal is then amplified by a transimpedance amplifier 9-7 and converted into an electrical voltage pulse train. The voltage pulse train is amplified by a limiter amplifier 9-2. The output signal from the limiter amplifier 9-2 forms a pilot or control signal for a digital circuit which has a counter 9-3 and a latch register 9-4. The counter 9-3 is connected to a clock generator 9-5 and counts the rising signal edges of the applied fixed clock signal. The counter output, which comprises a 12-bit count, for example, is connected to an input of the latch register 9-4. The rising signal edge of the control signal is used to transfer the output of the counter 9-3 to the latch register 9-4. The falling signal edge of the control signal CTRL is used to reset the counter 9-3 to zero. The content of the latch register 9-4 or the count can, as shown in FIG. 4, be read and evaluated by a microcontroller 9-6.

Since the counter reading is reset upon the falling signal edge of the optical pulse train, and then is increased by a value 1 with each period of the fixed clock signal, the counter reading upon the rising signal edge of the next optical pulse is proportional to the time between two successive pulses and hence inversely proportional to the power of the optical signal which is to be measured.

At time t, the voltage in the capacitor 6-3 within the signal conversion device 6 with the capacitance C is:

$$U = \frac{1}{C}\int_{t1}^{t1+t} R \cdot p(\tau)d\tau. \tag{1}$$

At time t1, the capacitor 6-3 is completely discharged as a result of discharge via the nonlinear circuit 6-4. R represents the responsivity of the photodiode 6-1 in the signal conversion device 6. The signal conversion device 6 produces an optical pulse when the voltage $U_c$ has reached a threshold value $U_{th}$. Depending on the optical power $p(\tau)$ of the received optical user signal, this is the case when:

$$\int_{t1}^{t1+t} p(\tau)d\tau = \frac{C \cdot Uth}{R}. \tag{2}$$

If the average power $P_{avg}$ during a measurement period is:

$$P_{avg} = \frac{\int_{t1}^{t1+t} p(\tau)d\tau}{t} \quad (3)$$

then the optical signal pulse is generated after a time t:

$$t = \frac{C \cdot U_{th}}{R \cdot P_{avg}}. \quad (4)$$

The period t between two optical signal pulses of the measurement signal is therefore inversely proportional to the average power in the measurement period.

In a typical application, the period t between two signal pulses is in a range between 10 µs and 1 ms. If the frequency of the fixed clock signal is 2 MHz then the counter 9-3 in a detection device 9 with a 12-bit counter output overflows at: $2^{12}/2$ MHz=2.05 ms.

This time represents the longest measurable time period. The smallest measurable unit of time is ½ MHz=500 ns.

This signifies a maximum measurement error of 5% of the highest measurable power (corresponding to the shortest time period between two signal pulses of 10 µs).

By changing the counter length of the counter 9-3 and the frequency of the fixed clock signal from the clock signal generator 9-5, it is possible to adapt the detection device 9 for the respective application.

In one possible embodiment, a circuit with low power consumption which is powered by a long-life battery is used for the signal conversion device 6 at the user end, which means that the signal conversion device 6 operates in almost maintenance-free fashion for a long period.

The detection device 9 arranged on an interface appliance of the network operator detects the light pulses in the received pulsed measurement signal after a wavelength demultiplex operation and measures the pulse repetition rate using electronic means. Since the detection device 9 is located at the network operator end, it is also possible to use a circuit for this purpose which consumes a relatively large amount of power. The pulse repetition rate can be converted into an optical power level and, following signal processing, evaluated in order to determine the quality of the signal transmission via the link to the user.

In one possible embodiment, the signal conversion device 6, as is shown in FIG. 3, for example, is integrated at one end of a fiber-optic cable, which may comprise one or more optical fibers 4.

In one possible embodiment, the detection device 9, as is shown in FIG. 4, for example, is integrated at the other end of the fiber-optic cable. In a further embodiment of the measurement arrangement 1 according to the invention, the signal conversion device 6 together with the signal decoupling device 5 and the multiplexer 7 may be integrated in the transceiver 3 of the user.

In one possible embodiment, parameters for the signal conversion device 6, particularly the capacitance C of the capacitor 6-3 and the threshold value voltage $U_{th}$ of the nonlinear circuit 6-4, can be adjusted for the purposes of adaptation for the respective application.

In one possible embodiment, parameters for the detection device 9, particularly the clock frequency of the clock generator 9-5, can be adjusted for the purposes of adaptation to suit the respective application.

The measurement arrangement according to the invention is used to measure the optical power P of the user signal in a glass fiber or optical fiber 4 with minimal outlay in terms of power and space and to transmit it to the remote detection device 9. The distance between the transceiver 2 of the network operator and the transceiver 3 of the user may involve several kilometers in this case.

The invention claimed is:

1. A method for measuring a power for an optical user signal transmitted via an optical fiber, having the following steps:
(a) the transmitted optical user signal is converted into a pulsed optical measurement signal, the pulsed repetition rate of which is dependent on the power of the transmitted optical user signal;
(b) the pulse repetition rate of the converted optical measurement signal is evaluated in order to ascertain the power of the optical user signal transmitted via the optical fiber;
wherein the transmitted optical user signal is transmitted via the optical fiber between a network operator transceiver of a network operator and a user transceiver of a user;
wherein the transmitted optical user signal is at least partially decoupled from the optical fiber at the user transceiver end by a power splitter for the purpose of measuring power, and
wherein a coupling ratio of the power splitter is designed such that sufficient signal power for the determination of the power level is supplied to a signal conversion device.

2. The method as claimed in claim 1, wherein the converted pulsed optical measurement signal is launched into the optical fiber of the transmitted optical user signal or into a different optical fiber by a multiplexer and is supplied to a detection device situated at the network operator transceiver end for the purpose of evaluating the pulse repetition rate of the pulsed optical measurement signal.

3. The method as claimed in claim 1, wherein the optical measurement signal has a different wavelength than the optical user signal.

4. The method as claimed in claim 1, wherein the pulse repetition rate of the pulsed optical measurement signal is proportional to the power of the transmitted optical user signal.

5. A measurement arrangement for measuring a power for an optical user signal transmitted via an optical fiber, comprising:
(a) a signal conversion device for converting the optical user signal into a pulsed optical measurement signal, the pulse repetition rate of which is dependent on the power of the optical user signal;
(b) a detection device which evaluates the pulse repetition rate of the converted pulsed optical measurement signal in order to ascertain the power of the optical user signal transmitted via the optical fiber; and
(c) a power splitter which at least partially decouples the optical user signal transmitted on the optical fiber to the signal conversion device;
wherein a coupling ratio of the power splitter is designed such that sufficient signal power for the determination of the power level is supplied to the signal conversion device.

6. The measurement arrangement as claimed in claim 5, wherein the measurement arrangement has a multiplexer which loops back the optical measurement signal into the optical fiber of the optical user signal or launches it into a different optical fiber.

7. The measurement arrangement as claimed in claim 5, wherein the signal conversion device has:
   a photodiode which converts the decoupled optical user signal into an electrical charging current,
   a capacitor which is charged by the charging current until a threshold value voltage is reached, and
   a nonlinear electronic circuit which connects the charged capacitor to a laser diode when the threshold value voltage is reached, said capacitor being discharged via the laser diode, which emits optical light pulses.

8. The measurement arrangement as claimed in claim 5, wherein the signal conversion device and the detection device are provided at opposite ends of the optical fiber provided for the transmission of the optical user signal.

9. An arrangement for transmitting an optical user signal via an optical fiber, said user signal being decoupled at at least one of the two ends of the optical fiber by a power splitter, to a signal conversion device which converts the decoupled optical user signal into a pulsed optical measurement signal, the pulse repetition rate of which is dependent on the power of the transmitted optical user signal, wherein a coupling ratio of the power splitter is designed such that sufficient signal power for the determination of the power level is supplied to the signal conversion device.

10. The arrangement as claimed in claim 9, wherein the arrangement has, at the other end of the optical fiber, a detection device which evaluates the pulse repetition rate of the converted pulsed optical measurement signal in order to ascertain the power of the optical user signal transmitted via the optical fiber.

11. The arrangement as claimed in claim 9, wherein the arrangement has a multiplexer which loops back the optical measurement signal into the optical fiber of the optical user signal or launches it into a different optical fiber.

* * * * *